Dec. 7, 1937.  B. H. ANIBAL  2,101,727
GEAR SHIFT LEVER MOUNTING
Filed Sept. 30, 1936
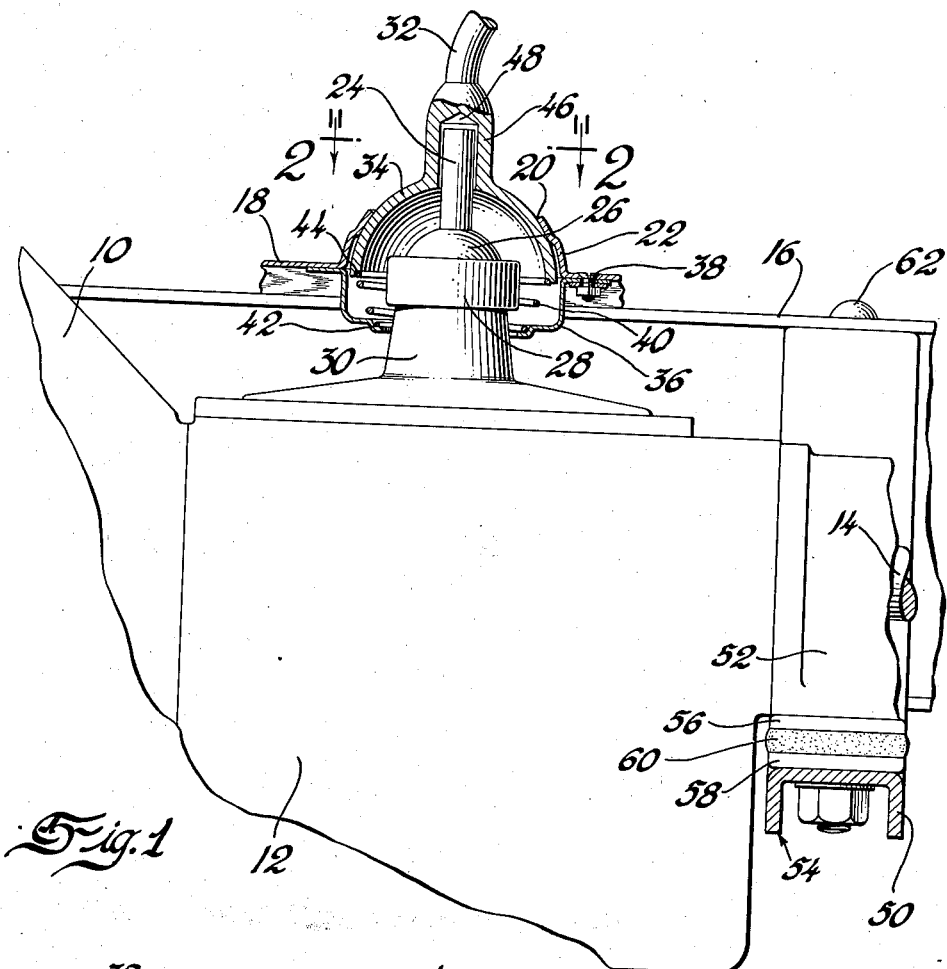
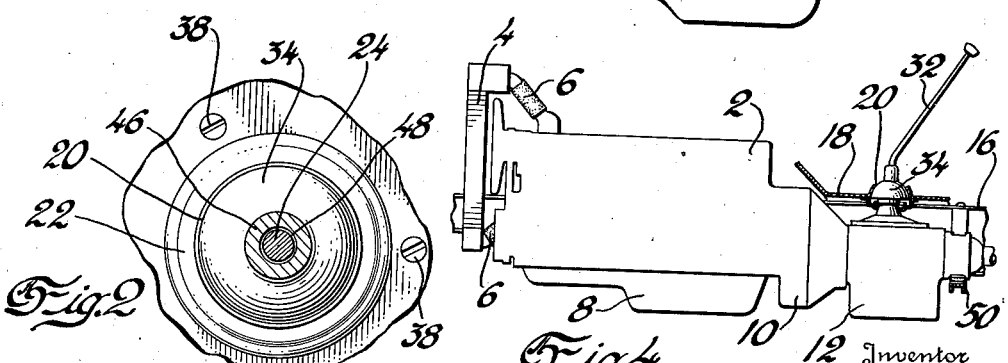
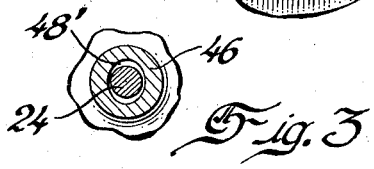
Inventor
Benjamin H. Anibal
By Blackmore, Spencer & Flint
Attorneys Patented Dec. 7, 1937

2,101,727

UNITED STATES PATENT OFFICE 2,101,727

GEAR SHIFT LEVER MOUNTING

Benjamin H. Anibal, Pontiac, Mich., assignor to General Motors Corporation, Detroit, Mich., a corporation of Delaware Application September 30, 1936, Serial No. 103,264

4 Claims. (Cl. 180—64)

This invention relates to automotive vehicles and has particular reference to a construction to avoid the chattering or rattle of the gear shift lever due to the vibrations or movements of the engine relative to the body.

Owing to the rigid connection between the gear shift lever and the transmission it is well known that when the engine vibrates in the frame due to the rubber mountings on which the engine is positioned, these vibrations will be communicated to the transmission case and to the shift lever, causing the latter to rattle due to the relative movement between the transmission and the vehicle floor. It is the object of the present invention to eliminate the chattering or shaking of the gear shift lever due to the engine vibrations. To accomplish this object the gear shift lever is made in two parts, the lever being split just above the usual universal ball connection in the dome projecting from the transmission. The shifter lever itself is connected to the lever projecting from the transmission case by means of a socket which is somewhat larger than the lever end. The reason for the oversized socket is to allow the transmission lever a certain amount of movement before it will strike the shifter lever. The shifter lever itself is mounted in the floor by means of a ball carrier and ball connection to allow a universal movement of the lever.

On the drawing

Figure 1 shows an enlarged view of the transmission case and associated parts with the floor and the parts of the invention shown in section.

Figure 2 is a section on the line 2—2 of Figure 1.

Figure 3 is a sectional view similar to Figure 2 showing a modification.

Figure 4 is a general view showing the arrangement of the engine, clutch and transmission.

On the drawing, the numeral 2 indicates an internal combustion engine. The engine has the usual radiator 4 forming a part of the cooling system 6. The oil pan is indicated at 8, clutch housing at 10, transmission at 12, and the propeller shaft at 14. The frame of the vehicle is indicated at 16. The engine 2, clutch housing 10, and transmission 12 are rigidly connected together in the usual way. The engine 2, as is customary in modern practice, is mounted in rubber (not shown) in any well known way to allow a certain amount of movement to the engine in the frame 16 and prevent the vibrations in the engine from being transmitted to the frame and to the body of the vehicle.

The vehicle has the usual floor 18 mounted on the chassis 16 in the usual way, the floor in this instance being of metal and having formed therein an opening 20 which is surrounded by a ball retainer 22. The opening 20 is immediately above the lever 24 which has the usual ball joint 26 mounted in the top 28 of the dome 30 secured to the top of the transmission housing 12. The end of the lever 24 inside the transmission is provided with the usual shifter fork to shift the gears of the transmission in the conventional and well known way. The lever 24 projects toward the floor 18 and through the opening 20. The lever 24 is short and instead of projecting a substantial distance into the vehicle to enable the operator to grip the end thereof and operate the transmission, a second or shifter lever 32 is provided. This lever is formed into hemispherical shape as shown at 34 and fits inside the ball carrier 22. A retaining cup 36 under the opening 20 is secured to the floor by means of suitable screws and nuts 38 and houses a conical coil spring 40 the smaller end of which is received in a seat 42 in the bottom cup 36 while the upper or larger end is receiver in the rabbet 44 at the lower part of the hemispherical section 34. The function of the spring 40 is constantly to urge the hemispherical part 34 against the ball retainer 22.

The lever 32 immediately above the hemispherical shaped part 34 is enlarged as at 46 and has a socket or recess 48 formed therein in which there is received the end of the lever 24. As is shown in Figures 1 and 2, the socket 48 is somewhat larger than the lever 24 so that there is looseness or play between the two. The reason for this construction is that when the engine vibrates and communicates its vibrations to the transmission case 12 through the clutch housing 10, the shaft 24 will be allowed a certain amount of movement before coming in contact with and moving the lever 32. In this way there is eliminated the usual chatter or vibration of the lever 32 due to the vibration of the engine. For ordinary purposes the amount of space, or the clearance between the walls of the socket 48 and the lever 24, is ample to accommodate the usual engine vibrations.

In Figure 3 there is shown a modification of the structure shown in Figures 1 and 2. The socket 48' is oval instead of round, the larger portion of the oval being laterally of the vehicle, and will allow a greater transverse movement of the lever than a longitudinal one. It has been found that the transverse movements are more frequent and greater in amplitude than the longitudinal movements and an oval opening such as shown in Figure 3 will accommodate a larger transverse movement than the round opening in Figures 1 and 2.

In Figures 1 and 4 the usual transverse cradle or carrier for the rear end of the transmission is indicated at 50. The transmission has an extension 52 which rests on a resilient support 54, the resilient support comprising upper and lower metal plates 56 and 58 with a rubber pad 60 therebetween. The cradle 50 is connected to the frame by means of the usual rivets 62.

I claim:

1. In an automotive vehicle having an engine and a transmission connected to the engine, a floor, one lever only mounted on the transmission and projecting toward the floor, a shifting lever mounted on the floor adjacent the transmission and capable of engaging the first mentioned lever to operate the transmission, the connection between said two levers including a clearance to enable the engine and transmission to move in all directions relative to the floor without affecting the shifting lever.

2. In an automotive vehicle having an engine and a transmission connected to the engine, a floor, a lever mounted on the transmission and projecting toward the floor, a shifting lever mounted on the floor adjacent the transmission, said shifting lever having a socket fitting over and on the first mentioned lever to enable the shifting lever to move the first lever to operate the transmission, said socket fitting freely over the lever end to provide clearance between the two levers to enable the engine and transmission to move relative to the floor without affecting the shifting lever.

3. In an automotive vehicle having an engine and a transmission connected to the engine, a floor above the transmission, a lever mounted on the transmission and projecting toward the floor, a ball retainer on the floor above the lever, a shifting lever having its lower end formed into ball shape to correspond to the ball retainer on the floor, means to urge said ball shaped end against the retainer, and a connection between the first mentioned lever and the shifting lever to enable the shifting lever to move the first mentioned lever to operate the transmission, said connection providing a sufficient clearance to enable the engine and transmission to move relative to the floor without affecting the shifting lever.

4. In an automotive vehicle having an engine and a transmission connected to the engine, a floor above the transmission, a lever mounted on the transmission and projecting toward the floor, a ball retainer formed in the floor above the lever, a shifting lever having its lower end formed into ball shape to correspond to the ball retainer in the floor, means to urge said ball shaped end against the retainer, a socket in the shifting lever, said first mentioned lever projecting loosely into the socket to enable the shifting lever to move the first mentioned lever to operate the transmission, said looseness in the connection between the levers enabling the engine and transmission to move relative to the floor without affecting the shifting lever.

BENJAMIN H. ANIBAL.